US010789049B2

(12) United States Patent
Zhou et al.

(10) Patent No.: US 10,789,049 B2
(45) Date of Patent: Sep. 29, 2020

(54) RECIPE PROGRAM CODE GENERATION METHOD AND RECIPE COMPILING CLOUD PLATFORM SYSTEM

(71) Applicant: SHENZHEN YIJUYUN TECHNOLOGY CO.,LTD, Shenzhen, Guangdong (CN)

(72) Inventors: Jingsheng Zhou, Guangdong (CN); Weiguo Zhang, Guangdong (CN)

(73) Assignee: SHENZHEN YIJUYUN TECHNOLOGY CO., LTD, Shenzhen, Guangdong (CN)

(*) Notice: Subject to any disclaimer, the term of this patent is extended or adjusted under 35 U.S.C. 154(b) by 365 days.

(21) Appl. No.: 15/771,090

(22) PCT Filed: Mar. 2, 2017

(86) PCT No.: PCT/CN2017/075482
§ 371 (c)(1),
(2) Date: Apr. 26, 2018

(87) PCT Pub. No.: WO2018/113096
PCT Pub. Date: Jun. 28, 2018

(65) Prior Publication Data
US 2020/0241847 A1 Jul. 30, 2020

(30) Foreign Application Priority Data
Dec. 21, 2016 (CN) .......................... 2016 1 1190190

(51) Int. Cl.
*G06F 3/0485* (2013.01)
*G06F 8/30* (2018.01)
(Continued)

(52) U.S. Cl.
CPC ................ *G06F 8/311* (2013.01); *G06F 8/41* (2013.01); *G06F 16/367* (2019.01);
(Continued)

(58) Field of Classification Search
CPC .......... G06F 8/311; G06F 8/41; G06F 16/367; G06F 16/9038; G06F 16/951; G06F 16/90335; G06F 16/9535; H04L 67/02
See application file for complete search history.

(56) References Cited

U.S. PATENT DOCUMENTS 7,523,302 B1 * 4/2009 Brown ................ G06F 21/6209
380/201
9,702,858 B1 * 7/2017 Minvielle ........... A47J 37/0623
(Continued)

FOREIGN PATENT DOCUMENTS

CN 103984247 8/2014
CN 104461501 3/2015
(Continued)

OTHER PUBLICATIONS

Reiko Hamada et al., Cooking Navi: Assistant for Daily Cooking in Kitchen, Nov. 6-11, 2005, [Retrieved on Jun. 19, 2020]. Retrieved from the internet: <URL: https://dl.acm.org/doi/pdf/10.1145/1101149.1101228> 4 Pages (371-374) (Year: 2005).*
(Continued)

*Primary Examiner* — Anibal Rivera
(74) *Attorney, Agent, or Firm* — JCIPRNET

(57) ABSTRACT

The invention relates to the technical field of cooking, in particular to a recipe program code generation method and a recipe compiling cloud platform system. The recipe program code generation method comprises the following steps: firstly, establishing equipment attribute and control description terms which are associated with corresponding attributes or cooking motions of equipment and also associated with a description keyword term bank; then, selecting corresponding cooking equipment and inputting a literal description recipe; finally, analyzing description keywords in the literal recipe by compiling software and associating the description keywords with the equipment attribute and
(Continued)

control description terms of the cooking equipment of the corresponding type, so that recipe program codes are generated. According to the recipe compiling method and the cloud platform system of the invention, the recipe program codes can be generated through automatic conversion as long as the corresponding cooking equipment is selected and the literal recipe is input, recipe editors do not need to be familiar with computer programming languages, the technical problems of recipe program code generation in the prior art are solved, the recipe program generation efficiency and effect are improved, and it is ensured that the recipe program codes can be executed on the cooking equipment safely and reliably.

7 Claims, 3 Drawing Sheets

(51) Int. Cl.
  *G06F 8/41*       (2018.01)
  *G06F 16/36*      (2019.01)
  *G06F 16/9535*    (2019.01)
  *G06F 16/903*     (2019.01)
  G06F 16/9038      (2019.01)
  G06F 16/951       (2019.01)

(52) U.S. Cl.
  CPC .... *G06F 16/90335* (2019.01); *G06F 16/9535* (2019.01); *G06F 16/9038* (2019.01); *G06F 16/951* (2019.01)

(56) References Cited

U.S. PATENT DOCUMENTS

| | | | |
|---|---|---|---|
| 10,545,632 B2* | 1/2020 | Aso | G06F 3/1415 |
| 2009/0259688 A1* | 10/2009 | Do | G06F 3/016 |
| 2011/0055044 A1* | 3/2011 | Wiedl | G06Q 30/0621 |
| | | | 705/26.5 |
| 2012/0027904 A1* | 2/2012 | Lim | F24C 7/082 |
| | | | 426/523 |
| 2013/0171304 A1* | 7/2013 | Huntley | G06Q 50/00 |
| | | | 426/231 |
| 2014/0089321 A1* | 3/2014 | Engel | G06F 16/9535 |
| | | | 707/748 |
| 2014/0144977 A1* | 5/2014 | Argue | G06Q 30/0633 |
| | | | 235/375 |
| 2014/0263411 A1* | 9/2014 | Quartarone | B67D 1/0021 |
| | | | 222/1 |
| 2015/0019987 A1* | 1/2015 | Kouda | H04L 67/02 |
| | | | 715/744 |
| 2015/0025687 A1* | 1/2015 | Henderson | A23B 4/052 |
| | | | 700/275 |
| 2015/0066909 A1* | 3/2015 | Uchida | G06F 16/951 |
| | | | 707/722 |
| 2015/0163865 A1* | 6/2015 | Lee | A23L 5/10 |
| | | | 426/231 |
| 2015/0228197 A1* | 8/2015 | McKinney | G09B 7/00 |
| | | | 434/127 |
| 2015/0290795 A1* | 10/2015 | Oleynik | B25J 9/0081 |
| | | | 700/257 |
| 2015/0302762 A1* | 10/2015 | Sabourian-Tarwe | |
| | | | G09B 19/0092 |
| | | | 434/127 |
| 2015/0312964 A1* | 10/2015 | Sorenson | A47J 36/321 |
| | | | 219/448.13 |
| 2016/0059412 A1* | 3/2016 | Oleynik | B25J 13/02 |
| | | | 700/257 |
| 2016/0364613 A1* | 12/2016 | Kuroyama | H04N 5/23203 |
| 2016/0381742 A1* | 12/2016 | Banavara | H05B 6/6438 |
| | | | 99/331 |
| 2017/0074522 A1* | 3/2017 | Cheng | A47J 36/321 |
| 2017/0116580 A1* | 4/2017 | Kim | G06Q 10/1095 |
| 2017/0135159 A1* | 5/2017 | Sorenson | H05B 3/70 |
| 2017/0161290 A1* | 6/2017 | Kuroyama | G06F 16/90335 |
| 2017/0188741 A1* | 7/2017 | Thomas | G03B 17/561 |
| 2018/0008079 A1* | 1/2018 | Han | A47J 36/24 |
| 2018/0008083 A1* | 1/2018 | Han | A23P 20/20 |
| 2018/0082603 A1* | 3/2018 | Lim | G06F 16/9038 |
| 2018/0267683 A1* | 9/2018 | Tessier | G06F 3/0482 |

FOREIGN PATENT DOCUMENTS

| | | |
|---|---|---|
| CN | 104914898 | 9/2015 |
| CN | 104915203 | 9/2015 |
| CN | 105488339 | 4/2016 |

OTHER PUBLICATIONS

Jingjing Chen et al., Deep-based Ingredient Recognition for Cooking Recipe Retrieval, Oct. 15-19, 2016, [Retrieved on Jun. 19, 2020]. Retrieved from the internet: <URL: https://dl.acm.org/doi/pdf/10.1145/2964284.2964315> 4 Pages (371-374) (Year: 2016).*

* cited by examiner

RECIPE PROGRAM CODE GENERATION METHOD AND RECIPE COMPILING CLOUD PLATFORM SYSTEM

CROSS-REFERENCE TO RELATED APPLICATION

This application is a 371 application of the International PCT application serial no. PCT/CN2017/075482, filed on Mar. 2, 2017, which claims the priority benefit of China application no. 201611190190.3, filed on Dec. 21, 2016. The entirety of each of the above-mentioned patent applications is hereby incorporated by reference herein and made a part of this specification.

BACKGROUND OF THE INVENTION

Technical Field

The invention relates to the technical field of cooking, in particular to techniques for compiling literal recipes into recipe program codes for corresponding cooking equipment, and particularly provides a recipe program code generation method and a recipe compiling cloud platform system.

Description of Related Art

At present, recipe programs are stored in various types of automatic cooking equipment, and people can cook corresponding food by running the recipe programs. All these recipe programs include program codes which are written by professional programmers of cooking equipment manufacturing enterprises or relevant enterprises; for ensuring normal operation of cooking equipment, the cooking program codes need to be solidified, packaged and stored in the cooking equipment; for ensuring the reliability and safety of the cooking equipment, any modification, addition or deletion of the cooking program codes is not allowed except by relevant professional personnel. For example, if recipe programs are stored in a microwave oven, various kinds of food can be cooked through the recipe programs. For ensuring the safety and reliability of the intelligent microwave oven, all these recipe programs need to be designed, written, tested and debugged by professional personnel firstly and then are converted into control codes in a controller of the microwave oven. Obviously, the requirement for the writing process of the recipe programs is extremely high, and ordinary customers or cooks lacking corresponding professional knowledge and skills can hardly participate in compiling of recipe program codes.

Nowadays, with the development of the Internet of Things, many types of cooking equipment can be connected with the Internet, the functions of control, real-time prompt and the like can be achieved through mobile phone applications, corresponding recipe programs according with specifications can be downloaded from specific network platforms through the network, however, these recipe programs are uploaded to the specific network platforms after being designed, written, tested and debugged by professional personnel, recipe programs not according with the specifications cannot be accepted by cooking equipment, and consequentially corresponding cooking processes cannot be achieved. These recipe programs uploaded to the network are called cloud recipes, and it is required that the cloud recipes can be directly downloaded to cooking equipment to run and should be matched with mobile phone applications to achieve the real-time prompt function and other functions. For example, when a microwave oven is used for cooking steamed fish, fish needs to be turned over, at the moment, the cooking process of the microwave oven needs to be stopped temporarily until users turn the fish over, the mobile phone applications also need to prompt users to turn the fish over, and thus it is also required that the recipes should be matched with the mobile phone applications to display prompt content and the like.

Although a great number of literal description recipes exist on the network, these literal description recipes cannot be directly transmitted to cooking equipment for recognition and running due to the fact that professional personnel who can compile corresponding characters into recipe program codes of corresponding cooking equipment are not available.

Based on the above description, the problem lies in that under normal conditions, recipes are edited by non-programmers such as cooks, however, recipe programs are compiled and designed by relevant programmers. Programmers generally lack cooking skill knowledge and actual cooking experience and compile, test and debug recipe programs generally according to the understanding of literal meanings, and consequentially generated recipe program codes generally cannot achieve the optimal cooking effect; in addition, the process of manually compiling literal expressions into recipe program codes is time-consuming, and errors are likely to be caused in the process, so that long-time testing and debugging for correction are needed, and the efficiency is extremely low. Non-programmers such as cooks can also direct compile recipe programs after learning professional knowledge about software programming, however, it is obviously difficult to organize the non-programmers to learn relevant programming languages (such as the C language and JSON) and data structures.

In addition, instructions, specifications, structures and the like used for recipe programs for different types of cooking equipment made by different manufacturers are different, and thus recipe program codes for different types of cooking equipment made by different manufacturers cannot be written even by professional recipe programmers. Existing digital recipe generation software can generate digital recipes for different types of equipment made by different manufactures, but only support cooking equipment of limited types, and only literal recipes which are edited by means of cooking terms required by the digital recipe generation software can be input to the digital recipe generation software so as to be correctly converted into corresponding recipe program codes. Consequentially, existing digital recipe generation software only support cooking equipment of limited types and cannot meet the increasing requirements for recipe programs at present.

At present, with the development of the Internet of Things, a large quantity of cooking equipment has emerged, and the intelligent cooking equipment can be connected with specific cloud platforms and downward recipe program from the cloud platforms for cooking directly. The recipe codes on the cloud platforms are stored on the cloud platforms after being written by professional programmers of cooking equipment manufacturing enterprises or relevant enterprises, the cloud recipe programs which can be downloaded at present are extremely limited, and the requirements of the majority of intelligent cooking equipment users cannot be met. Furthermore, the majority of intelligent cooking equipment users hope that literal recipes obtained from books and the network can be directly downloaded to the intelligent cooking equipment for cooking, however, no solution can meet the requirement any all currently.

In conclusion, the personnel familiar with cooking skills such as cooks can describe the cooking processes of recipes, but cannot directly compile the cooking processes into recipe program codes which can be directly recognized and executed by cooking equipment due to the unfamiliarity with or lack of professional programming knowledge for writing recipe programs. As the programmers are not familiar with cooking knowledge, recipe program codes compiled by the programmers are barely satisfactory. The majority of cooking equipment users also cannot directly transmit literal recipes obtained from books and the network to cooking equipment for cooking. Therefore, in the prior art, the generation convenience, efficiency and accuracy of recipe program codes are not taken into consideration in the perspective of the cooking equipment manufacturers and the majority of actual users.

BRIEF SUMMARY OF THE INVENTION

To overcome the defects or disadvantages of the prior art, the invention aims to provide a recipe program code generation method and a recipe compiling cloud platform system. By adoption of the recipe program code generation method and the recipe compiling cloud platform system, recipe programs do not need to be compiled manually, and corresponding recipe program codes are directly compiled by the system according to recipes with literal descriptions, so that the requirement for programming knowledge and the probability of errors caused by manual compiling are avoided, the recipe program generation efficiency and effect are improved, and it is ensured that recipe program codes can be executed on cooking equipment safely and reliably.

According to the technical scheme adopted by the invention for realizing the above aim, the recipe program code generation method and the recipe compiling cloud platform system are provided, and the recipe program code generation method comprises the following steps:

Step S01, establishing an equipment attribute and control description term cloud database, wherein the equipment attribute and control description term cloud database includes attribute and control description terms of cooking equipment of different types, and each equipment attribute and control description term is associated with the corresponding attribute or cooking motion of the equipment;

Step S02, establishing a description keyword cloud database, wherein the description keyword cloud database includes keywords used for the description of a current literal recipe, and the keywords are associated with the equipment attribute and control description terms of cooking equipment of different types; the cloud database can be expanded infinitely based on powerful computation of cloud computers and can support new cooking equipment added at any time, and extraction and collection of the description keywords can be continuously perfected;

Step S03, obtaining the type of the cooking equipment and the literal recipe by the compiling software, analyzing description keywords in the literal recipe, associating the description keywords with the equipment attribute and control description terms of the cooking equipment of the obtained type, and generating a description recipe about the control process of the corresponding cooking equipment, wherein the description recipe can be matched with mobile phone applications, so that the recipe process, prompt content and the like are displayed;

Step S04, analyzing the description recipe, obtained through compiling, about the control process of the corresponding cooking equipment by the compiling software, so that a series of attribute parameters and control instructions which can be recognized and executed by the corresponding cooking equipment are formed, and recipe program codes according with the specification and data structure of the corresponding cooking equipment are generated.

As a further improvement of the invention, in Step S01, for cooking equipment of different types and different models, corresponding equipment attribute and control description terms are generated according to the attribute parameters, control processes and characteristics of the cooking equipment.

As a preferred embodiment of the invention, in Step S02, the description keywords are obtained based on the study and research on a great number of literal recipes.

As a preferred improvement of the invention, in Step S02, the equipment attribute and control description terms of the cooking equipment include the description of a plurality of cooking control processes as well as the description of the exit condition of the current cooking step and/or the description the next cooking step, and also include prompt literal descriptions.

As a further improvement of the invention, in Step S03, the recipe program codes in the compiling software are machine code data, C data or JSON data, and literal recipes are TXT data.

The recipe compiling cloud platform system for the recipe program code generation method comprises:

an equipment rule module, wherein the equipment rule module is used for establishing an equipment attribute and control description term cloud database, and each equipment attribute and control description term is associated with the corresponding attribute or cooking motion of equipment; when a piece of new cooking equipment needs to be added, equipment attribute and control description terms of the new cooking equipment can be established through the equipment rule module and are associated with relevant attributes or cooking motions of the new equipment;

a keyword rule module, wherein the keyword rule module is used for describing the keyword cloud database, and keywords are associated with the equipment attribute and control description terms of cooking equipment of different types; new text description keywords can be added through the keyword rule module and are associated with the equipment attribute and control description terms of the cooking equipment;

a writing module, wherein the writing module is used for writing and describing cooking processes by means of description keywords;

a compiling module, wherein the compiling module is used for obtaining the type of cooking equipment and a literal recipe through compiling software, analyzing description keywords in the literal recipe, and associating the description keywords with the equipment attribute and control description terms of the cooking equipment of the corresponding type, so that a description recipe about the control process of the corresponding cooking equipment is generated; then the generated description recipe about the control process of the cooking equipment is analyzed, so that a series of attribute parameters and control instructions which can be recognized and executed by the corresponding cooking equipment are formed, and recipe program codes according with the specification and data structure of the corresponding cooking equipment are generated;

an interface module, wherein the interface module is used for inputting the type of cooking equipment and the literal recipe text and outputting a compiling result;

a cloud database module, wherein the cloud database module is used for storing the established equipment attribute and control description terms, the description keywords, the association rule, and the specification rule, the data structure rule and the compiling rule for program codes of various types of cooking equipment.

A method for generating recipe program codes through the recipe compiling cloud platform system, comprising the following steps:

Step A, establishing communication connection between a third platform or a piece of cooking equipment and the cloud platform system, and inputting parameters such as the type and model of the cooking equipment and a literal recipe through the interface module;

Step B, establishing connection with the cloud database, analyzing the literal recipe according to description keywords and the type and model of the cooking equipment, and generating a description recipe about the control process of the corresponding cooking equipment through compiling;

Step C, establishing connection with the cloud database, analyzing the description recipe, obtained through compiling in the previous step, about the control process of the corresponding cooking equipment according to the type and model of the cooking equipment, and generating recipe program codes according with the specification and data structure of the corresponding cooking equipment through compiling;

Step D, outputting data or files obtained through compiling by means of the interface module, directly transmitting the data or files obtained through compiling to the cooking equipment by a third part obtaining the compiling result so as to execute the cooking process, and completing the cooking process.

Beneficial effects of the invention: for the recipe compiling method and the cloud platform system of the invention, firstly, the equipment attribute and control description terms are established, associated with the corresponding attributes or cooking motions of equipment and also associated with a description keyword term bank; then the corresponding cooking equipment is selected and the literal description recipe is input; finally, description keywords in the literal recipe are analyzed by compiling software and associated with the equipment attribute and control description terms of the cooking equipment of the corresponding type, so that a description recipe about the control process of the corresponding cooking equipment is generated, afterwards, the generated description recipe about the control process of the cooking equipment is analyzed, so that a series of attribute parameters and control instructions which can be recognized and executed by the corresponding cooking equipment are generated, and recipe program codes according with the specific specification and data structure of the corresponding cooking equipment are also generated. According to the recipe compiling method and the cloud platform system of the invention, as long as the corresponding cooking equipment is selected and the literal recipe is input, the recipe program codes can be generated through automatic conversion, recipe editors do not need to be familiar with computer programming languages, the technical problems of recipe program generation in the prior art are solved, the recipe program generation efficiency and effect are improved, and it is ensured that the recipe program codes can be executed on the cooking equipment safely and reliably.

The recipe compiling cloud platform system of the invention supports the one-click cooking function of existing cloud recipes, the number of recipes is expanded, the type of cooking equipment and to-be-compiled literal recipes can be directly input to various platform systems or mobile phone applications directly through the interface module, then recipe program codes compiled through the recipe compiling cloud platform system and the description recipe, matched with the mobile phone applications, about the control process can be obtained and then are directly transmitted to the intelligent cooking equipment to execute the cooking process, in this way, the one-click automatic cooking function is achieved for the corresponding literal recipe through the network or the mobile phone applications, the recipe program codes can be obtained without manual programming, testing and debugging of the literal recipe, and the recipe program code generation cloud system is completely automatic.

DETAILED DESCRIPTION OF THE INVENTION

A further description of the invention is given with the accompanying drawings and specific embodiments as follows.

Figure 1:
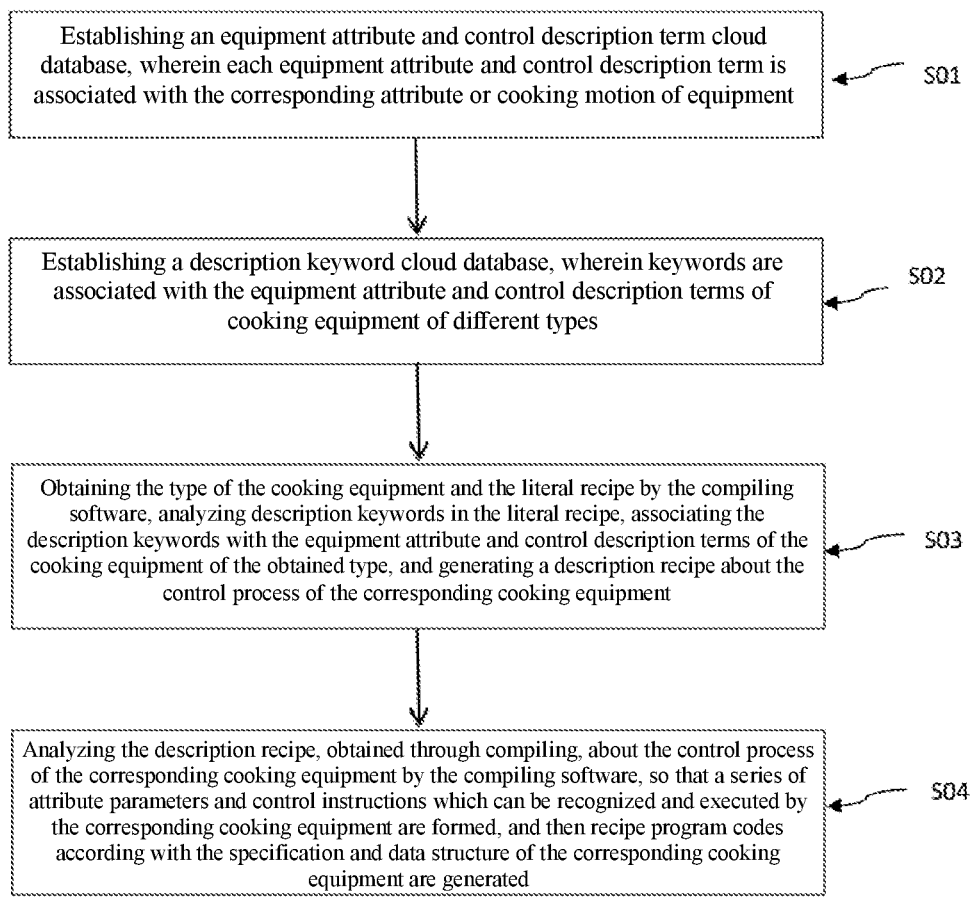
FIG. 1 is a flow diagram of a method for generating recipe program codes and a description recipe about the control process of the recipe program codes of the invention.

As is shown in FIG. 1, the invention discloses a recipe compiling method which comprises the following steps: Step S01, establishing an equipment attribute and control description term cloud database, wherein the equipment attribute and control description term cloud database includes attribute and control description terms of cooking equipment of different types, and each equipment attribute and control description term is associated with the corresponding attribute or cooking motion of the equipment; Step S02, establishing a description keyword cloud database, wherein the description keyword cloud database includes keywords used for the description of a current literal recipe, and the keywords are associated with the equipment attribute and control description terms of cooking equipment of different types; Step S03, obtaining the type of the cooking equipment and the literal recipe by the compiling software, analyzing description keywords in the literal recipe, associating the description keywords with the equipment attribute and control description terms of the cooking equipment of the obtained type, and generating a description recipe about the control process of the corresponding cooking equipment, wherein the description recipe can be matched with mobile phone applications, so that the recipe process, prompt content and the like are displayed; Step S04, analyzing the description recipe, obtained through compiling, about the control process of the corresponding cooking equipment by the compiling software, so that a series of attribute parameters and control instructions which can be recognized and executed by the corresponding cooking equipment are formed, and recipe program codes according with the specification and data structure of the corresponding cooking equipment are generated.

Figure 2:
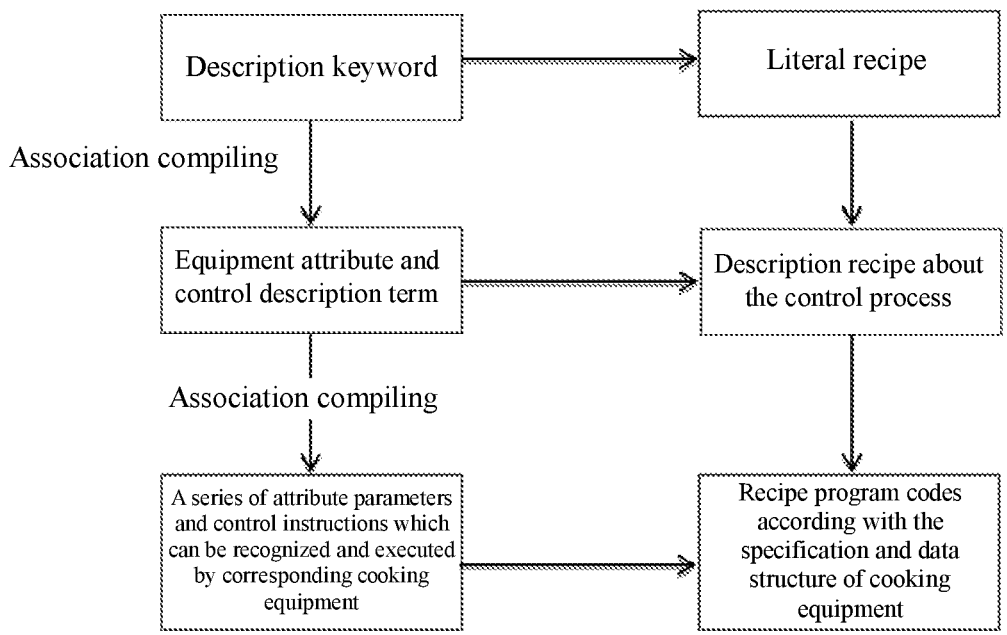
FIG. 2 is a flow diagram of constituent elements and relations between the constituent elements of the method of the invention.

As is shown in FIG. 2, in the invention, the description keywords are associated with the equipment attribute and control description terms, and the equipment attribute and control description terms are associated with the corresponding attributes or cooking motions of the equipment; based on the compiling rule, the compiling software analyzes corresponding keywords in the literal recipe according to the description keywords, so that the description recipe about the control process of the equipment is generated; then according to the equipment attribute and control description terms, the description recipe about the attribute and the control process of the equipment is analyzed into a series of attribute parameters and control instructions which can be recognized and executed by the cooking equipment, and the recipe program codes according with the specification and data structure of the cooking equipment are generated according to the specification and data structure of the cooking equipment.

Obviously, the core content of the equipment attribute and control description term cloud database includes the established equipment attribute and control description terms, the associations of the established equipment attribute and control description terms with the attributes, control instructions and control process of the cooking equipment, and the recipe program specification and data structure rule for the cooking equipment. For a further illustration of the detailed content described in Step S04, an intelligent microwave oven is taken as an example for an explanation. Based on the research and study on the intelligent microwave oven, it can be known that attribute parameters generally required in the cooking process of the intelligent microwave oven include: the flame intensity and the cooking time; control instructions for the intelligent microwave oven generally include start, pause, stop and end. Therefore, attribute and control description terms including the flame intensity, the cooking time, start, pause, stop and end are established for the intelligent microwave oven and are associated with the attribute parameters and control instructions of the intelligent microwave oven, and an attribute and control description term cloud database for the intelligent microwave oven is formed according to the recipe program specification and data structure rule of the intelligent microwave oven. For cooking equipment of different types and different models, corresponding independent equipment attribute and control description terms can be established.

The core content of the description keyword cloud database includes description keywords, semantic descriptions and the associations of the description keywords and the semantic descriptions with the attribute and control description terms of cooking equipment of various types and models. The description keywords are obtained based on the research, study and summarization on a greater number of literal recipes. For a further illustration of the detailed content described in Step S03, the intelligent microwave oven is taken as an example for an explanation. For a literal recipe with the following description: placing food materials into the microwave oven, cooking the food materials with the maximum flame intensity for five minutes, then stopping cooking temporarily and turning the food materials over, and cooking the food materials for three minutes, the compiling software can compile the literal recipe into a description recipe about the control process according to the keywords and semantic descriptions in the keyword cloud database, and the description recipe is as follows:

Start to cook,
Flame intensity: 100%;
Cooking time: 5 minutes;
Pause, reminding cooks of turning;
Cooking time: 3 minutes;
Completion of cooking.

The description recipe can be matched with mobile phone applications to display the cooking process.

In certain embodiments, in Step S03, input literal recipes are TXT files or word files; description recipes about the control process are XML files or JSON data files; in Step S04, the recipe program codes are C data files or JSON data files. All these file formats are in common description and data exchange formats universally accepted in the field, have good expansibility, executability and readability and can be written rapidly, cross-platform and cross-language data exchange can be achieved, control programs of cooking equipment can be tested and debugged conveniently, and recipe programs can be applied and popularized easily.

Figure 3:
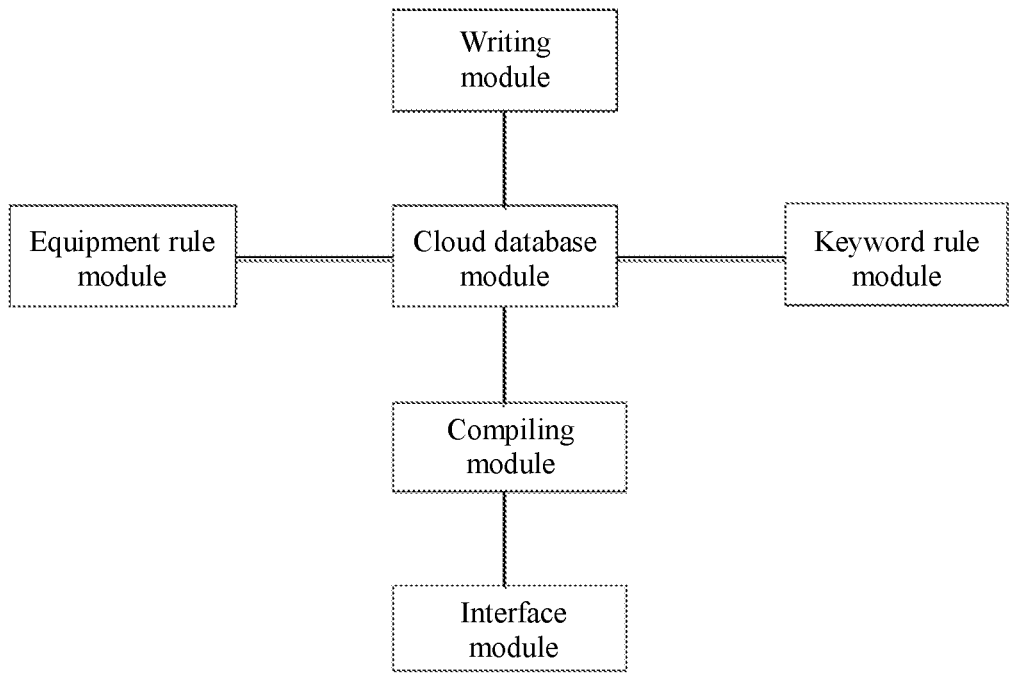
FIG. 3 is a structural block diagram of a recipe compiling cloud platform system of the invention.

As is shown in FIG. 3, the invention discloses a recipe compiling system. The specific scheme is as follows: the recipe compiling system comprises an equipment rule module, a keyword rule module, a writing module, a compiling module, an interface module and a cloud database module, wherein the equipment rule module is used for establishing an equipment attribute and control description term cloud database, and each equipment attribute and control description term is associated with the corresponding attribute or cooking motion of equipment; the keyword rule module is used for describing a keyword cloud database, keywords are associated with the equipment attribute and control description terms of cooking equipment of different types, and new literal description keywords can be added through the keyword rule module and are associated with the equipment attribute and control description terms of the cooking equipment; the writing module is used for writing and describing cooking processes by means of description keywords; the compiling module is used for obtaining the type of cooking equipment and a literal recipe through the compiling software, analyzing description keywords in the literal recipe, and associating the description keywords with the equipment attribute and control description terms of the cooking equipment of the corresponding type, so that a description recipe about the control process of the corresponding cooking equipment is generated, then the generated description recipe about the control process of the cooking equipment is analyzed, so that a series of attribute parameters and control instructions which can be recognized and executed by the corresponding cooking equipment are formed, and recipe program codes according with the specification and data structure of the corresponding cooking equipment are generated; the interface module is used for inputting the type of the cooking equipment and the literal recipe text and outputting a compiling result; the cloud database module is used for storing the established equipment attribute and control description terms, the description keywords, the association rule, and the specification rule, the data structure rule and the compiling rule for program codes of various types of cooking equipment.

Figure 4:
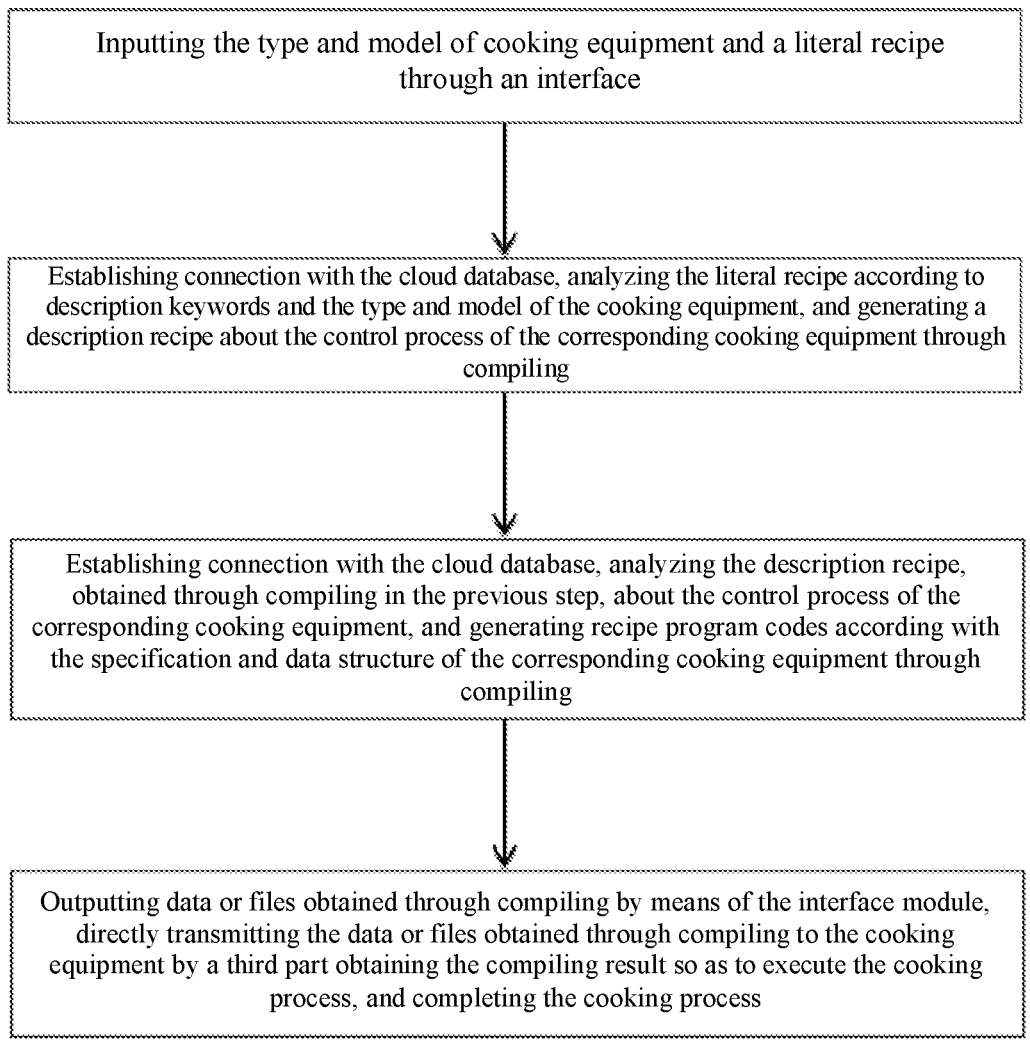
FIG. 4 is an illustrative block diagram of a method for generating recipe program codes through the recipe compiling cloud platform system.

As is shown in FIG. 4, the working process for generating recipe program codes through the recipe compiling cloud platform system mainly comprises four steps: Step 1, establishing communication connection between a third platform or a piece of cooking equipment and the cloud platform system, and inputting parameters such as the type and model of the cooking equipment and a literal recipe through the interface module; Step 2, establishing connection with the cloud database, analyzing the literal recipe according to description keywords and the type and model of the cooking equipment, and generating a description recipe about the control process of the corresponding cooking equipment through compiling; Step 3, establishing connection with the cloud database, analyzing the description recipe, obtained through compiling in the previous Step, about the control process of the corresponding cooking equipment according to the type and model of the cooking equipment, and generating recipe program codes according with the specification and data structure of the corresponding cooking equipment through compiling; Step 4, outputting data or files obtained through compiling by means of the interface module, directly transmitting the data or files obtained through compiling to the cooking equipment by a third part obtaining the compiling result so as to execute the cooking process, and completing the cooking process. For a further explanation of the technical improvements on the above steps, the specific content involved in each step is separately illustrated as follows.

Step 1, establishing communication connection between a third platform or a piece of cooking equipment and the cloud platform system, and inputting parameters such as the type and model of the cooking equipment and a literal recipe through the interface module;

specifically, the recipe compiling cloud platform system is set on a cloud server, the third side or the cooking equipment logs in the recipe compiling cloud platform server through Internet connection, and then the type and model of the cooking equipment and the literal recipe content needing to be compiled are input through an interface of the recipe compiling cloud platform system.

Step 2, establishing connection with the cloud database, analyzing the literal recipe according to description keywords and the type and model of the cooking equipment, and generating a description recipe about the control process of the corresponding cooking equipment through compiling;

specifically, the compiling software is connected with the cloud database, and the equipment attribute and control description terms of the cooking equipment are obtained according to the input type and model of the cooking equipment; in the keyword rule module, the keywords are associated with the equipment attribute and control description terms of cooking equipment of different types; the input literal recipe content is analyzed through the description keyword cloud database, and according to the keywords and semantic descriptions in the literal recipe, the description recipe about the control process of the cooking equipment of the input type is generated.

Step 3, establishing connection with the cloud database, analyzing the description recipe, obtained through compiling in the previous step, about the control process of the corresponding cooking equipment according to the type and model of the cooking equipment, and generating recipe program codes according with the specification and data structure of the corresponding cooking equipment through compiling;

specifically, the compiling software is connected with the cloud database, and the cooking function, attribute parameters and control instructions of the cooking equipment are obtained according to the input type and model of the cooking equipment; in the equipment rule module, each equipment attribute and control description term is associated with the corresponding attribute or cooking motion of the equipment; the description recipe, generated in Step 2, about the control process of the cooking equipment is analyzed by means of the equipment attribute and control description term cloud database, and the recipe program codes according with the specification and data structure of the corresponding cooking equipment is generated according to the specification and data structure rule of the cooking equipment of the input type.

The whole compiling process is automatically completed by the system, so that the automatic compiling efficiency of program files is greatly improved, and no professional programmer or few professional programmers need to get involved in the compiling process.

In certain embodiments, when semantic descriptions are compiled, the cooking content needs to be automatically realized by cooking equipment and then is compiled into attribute parameters and control instructions executed by the cooking equipment; the cooking process need to be completed through manual operation and then is compiled into corresponding prompt information instructions.

Step 4, outputting data or files obtained through compiling by means of the interface module, directly transmitting the data or files obtained through compiling to the cooking equipment by a third part obtaining the compiling result so as to execute the cooking process, and completing the cooking process;

specifically, the data or files generated through compiling are output to the third platform or the cooking equipment in communication connection with the cloud platform system through the Internet and the corresponding interface; the third side can directly transmit the data or files obtained through compiling to the cooking equipment; the cooking function, performance and parameters of the cooking equipment are realized after the cooking equipment obtains the recipe program codes, and then the corresponding cooking process is completed.

In certain embodiments, the recipe compiling system of the invention only compiles the cooking function, attribute parameters and control instructions of the cooking equipment in the cooking process and does not compile relevant descriptions and preparations of food materials in literal recipes, for example, the quantity, cleaning, dicing and the like of the food materials are not analyzed.

In certain embodiments, if the cooking equipment has the food material operating and processing function, relevant cooking content is compiled according to the relevant equipment attribute and control description terms, the cooking function, the attribute parameters and the control instructions of the cooking equipment.

The recipe compiling cloud platform system can compile literal recipes including, but not limited to, recipes in simplified Chinese, in traditional Chinese, in English and the like.

The above content is a further detailed description of the invention with several specific preferred embodiments, however, the specific embodiments of the invention are not only limited to the preferred embodiments in the above description. For those ordinarily skilled in the technical field of the invention, various simple deductions or substitutes can also be made without deviating from the concept of the invention, and all these deductions or substitutes should be within the protection scope of the invention.

What is claimed is:

1. A recipe program code generation method comprising the following steps:

Step S01, establishing an equipment attribute and control description term cloud database, wherein the equipment attribute and control description term cloud database includes attribute and control description terms of cooking equipment of different types, and each equipment attribute and control description term is associated with the corresponding attribute or cooking motion of the equipment;

Step S02, establishing a description keyword cloud database, wherein the description keyword cloud database includes keywords used for the description of a current literal recipe, and the keywords are associated with the equipment attribute and control description terms of cooking equipment of different types;

Step S03, obtaining the type of the cooking equipment and the literal recipe by the compiling software, analyzing description keywords in the literal recipe, associating the description keywords with the equipment attribute and control description terms of the cooking equipment of the obtained type, and generating a description recipe about the control process of the corresponding cooking equipment, wherein the description recipe can be matched with mobile phone applications, so that the recipe process, prompt content and the like are displayed;

Step S04, analyzing the description recipe, obtained through compiling, about the control process of the corresponding cooking equipment by the compiling software, so that a series of attribute parameters and control instructions which can be recognized and executed by the corresponding cooking equipment are formed, and recipe program codes according with the specification and data structure of the corresponding cooking equipment are generated.

2. The recipe program code generation method according to claim 1, wherein in Step S01, for cooking equipment of different types and different models, corresponding equipment attribute and control description terms are generated according to the attribute parameters, control processes and characteristics of the cooking equipment.

3. The recipe program code generation method according to claim 1, wherein in Step S02, the description keywords are obtained based on the study and research on a great number of literal recipes.

4. The recipe program code generation method according to claim 3, wherein in Step S02, the equipment attribute and control description terms of the cooking equipment include the description of a plurality of cooking control processes as well as the description of the exit condition of the current cooking step and/or the description of the next cooking step, and also include prompt literal descriptions.

5. The recipe program code generation method according to claim 1, wherein in Step S03, the recipe program codes in the compiling software are machine code data, C data or JSON data, and literal recipes are TXT data.

6. A recipe compiling cloud platform system for the recipe program code generation method according to claim 1, comprising:

an equipment rule module, wherein the equipment rule module is used for establishing an equipment attribute and control description term cloud database, and each equipment attribute and control description term is associated with the corresponding attribute or cooking motion of equipment; when a piece of new cooking equipment needs to be added, equipment attribute and control description terms of the new cooking equipment can be established through the equipment rule module and are associated with relevant attributes or cooking motions of the new equipment;

a keyword rule module, wherein the keyword rule module is used for describing a keyword cloud database, and keywords are associated with the equipment attribute and control description terms of cooking equipment of different types; new literal description keywords can be added through the keyword rule module and are associated with the equipment attribute and control description terms of cooking equipment;

a writing module, wherein the writing module is used for writing and describing cooking processes by means of description keywords;

a compiling module, wherein the compiling module is used for obtaining the type of cooking equipment and a literal recipe through compiling software, analyzing description keywords in the literal recipe, and associating the description keywords with the equipment attribute and control description terms of the cooking equipment of the corresponding type, so that a description recipe about the control process of the corresponding cooking equipment is generated; then the generated description recipe about the control process of the cooking equipment is analyzed, so that a series of attribute parameters and control instructions which can be recognized and executed by the corresponding cooking equipment are formed, and recipe program codes according with the specification and data structure of the corresponding cooking equipment are generated;

an interface module, wherein the interface module is used for inputting the type of cooking equipment and the literal recipe text and outputting a compiling result;

a cloud database module, wherein the cloud database module is used for storing the established equipment attribute and control description terms, the description keywords, the association rule, and the specification rule, the data structure rule and the compiling rule for program codes of various types of cooking equipment.

7. A method for generating recipe program codes through the recipe compiling cloud platform system according to claim 6 comprising the following steps:

Step A, establishing communication connection between a third platform or a piece of cooking equipment and the cloud platform system, and inputting parameters such as the type and model of the cooking equipment and a literal recipe through the interface module;

Step B, establishing connection with the cloud database, analyzing the literal recipe according to description keywords and the type and model of the cooking equipment, and generating a description recipe about the control process of the corresponding cooking equipment through compiling;

Step C, establishing connection with the cloud database, analyzing the description recipe, obtained through compiling in the previous step, about the control process of the corresponding cooking equipment according to the type and model of the cooking equipment, and generating recipe program codes according with the specification and data structure of the corresponding cooking equipment through compiling;

Step D, outputting data or files obtained through compiling by means of the interface module, directly transmitting the data or files obtained through compiling to the cooking equipment by a third part obtaining the compiling result so as to execute the cooking process, and completing the cooking process.

* * * * *